United States Patent

Mikiya

Patent Number: 4,498,658
Date of Patent: Feb. 12, 1985

[54] PIPE COUPLER ARRANGEMENT

[75] Inventor: Toshio Mikiya, Tokyo, Japan

[73] Assignee: Nitto Kohki Co., Ltd., Tokyo, Japan

[21] Appl. No.: 415,381

[22] Filed: Sep. 7, 1982

[30] Foreign Application Priority Data

Sep. 7, 1981 [JP] Japan ............... 56-139820

[51] Int. Cl.³ ............... F16L 37/28
[52] U.S. Cl. ............... 251/149.6; 285/277; 285/316; 251/DIG. 1
[58] Field of Search ............... 285/277, 316; 251/149.6, DIG. 1

[56] References Cited

U.S. PATENT DOCUMENTS

| | | | |
|---|---|---|---|
| 3,052,261 | 9/1962 | Nyberg | 251/149.6 |
| 3,378,225 | 4/1968 | Snyder, Jr. | 251/149.6 |
| 3,583,667 | 6/1971 | Amneus | 251/149.6 |
| 3,788,598 | 1/1974 | German et al. | 251/149.6 |
| 4,118,006 | 10/1978 | Norton et al. | 251/149.6 |
| 4,280,523 | 7/1981 | Norton | 251/149.6 |

Primary Examiner—A. Michael Chambers
Attorney, Agent, or Firm—Birch, Stewart, Kolasch & Birch

[57] ABSTRACT

A pipe coupler including a socket having a valve member provided with a fluid passage and a plug designed to engage and open the valve member. A locking ball is provided to retain the plug relative to the socket after insertion therein. The valve member includes a blank flange normally engaged against an annular seal to close the fluid passage. A locking ball-bearing annulus is slidably mounted within the socket to normally hold the locking ball in a disengaged position. A single O-ring is positioned between the valve member and the bearing annulus in such a manner that the single O-ring is not subjected to any axially excessive force when the blank flange engages the annular seal. The single O-ring includes an outer surface and an inner surface which seal against the inner surface of the socket and the outer surface of the plug, respectively. The single O-ring is axially displaced relative to the blank flange and the annular seal to engage the plug and form a seal therebetween prior to the engagement or disengagement of the blank flange by the plug.

8 Claims, 4 Drawing Figures

PIPE COUPLER ARRANGEMENT

BACKGROUND OF THE INVENTION

The present invetion relates to a pipe coupler for a hose or pipe containing fluids. A typical example of the pipe coupler is shown in FIG. 4, in which the valve member 41 provided in a socket 40 is opened and closed by engagement and disengagement with a plug. The valve member 41 includes outer and inner surface grooves 42 and 43, into which O-rings 44 and 45 are fitted to maintain a sealing engagement with the outer periphery of the plug or with the inner face of the socket. However, the grooves for the O-rings are provided by a time-consuming and troublesome cutting process. In addition, difficulties are encountered not only in maintaining an entirely sealed condition at all times, but also in cutting into the coupler of such a structure. For these reasons prior art couplers could not be constructed to be small in size. Moreover, in the embodiment as illustrated in FIG. 4, the O-rings are constantly transformed under compression loads, and are lacking in the recovery of elasticity. A seal provided by the O-rings is also limited to the radial inside or outside dimension of the valve member 41. To seal both the inner and outer surfaces of the member 41, the O-ring should be fitted into the grooves formed in both the inner and outer walls thereof. Thus, the valve member should be long enough to provide space for such grooves. With this arrangement, sealing between the outer surface of the valve and the inner surface of the socket was incomplete, when the valve was opened.

SUMMARY OF THE INVENTION

A main object of the present invention is therefore to provide a solution to the above-mentioned problems.

According to the present invention, a locking ball-bearing annulus is provided apart from a valve member. They are housed in a socket with an O-ring being interposed therebetween within the limits of its recovery of elasticity under compression, so that any undesired force is not applied to the O-ring during coupling or decoupling of the plug into or out of the socket. Thus, the O-ring retains its recovery of elasticity over extended periods of time, and can seal the inner and outer surfaces of the valve member and, at the same time, the inner surface of the pocket, resulting in a reduction in the size of the socket.

BRIEF DESCRIPTION OF THE DRAWINGS

The above-mentioned and other objects and features of the present invention will become apparent from a reading of the following detailed description with reference to the drawings, in which.

PREFERRED EMBODIMENT OF THE INVENTION

Figure 2:
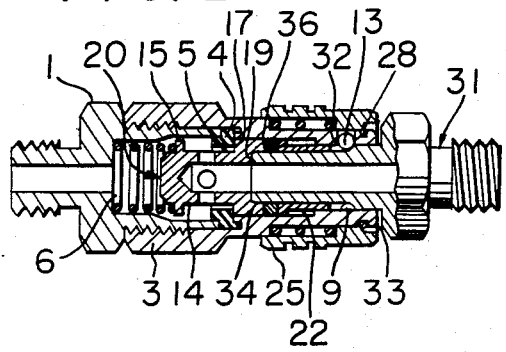
FIG. 2 is a sectional view showing a coupling of the plug with the socket.

A female coupler or socket, generally shown at 29, includes an inner housing 1 having its one end adapted to be connected to the end of a hose or pipe and an outer (cylindrical) housing 3 having a main cavity 2. An annular seal 4, formed of resin, is fixedly provided between both housings, and includes a central bore 5 of an increased diameter. The housing 1 is stepped at 6, while the housing 3 is provided on the inside of its open end with an engaging step 8 in the annular form, and at its open end with an extension 11 having an increased thickness, so that a bore 9 through which a male coupler or plug (to be described later) passes is defined, terminating at the open end of the housing 3. As illustrated, the bore 9 has a diameter slightly smaller than the diameter of the main cavity 2. A plurality of radially tapered slots 12, 12 are formed through the extension 11 from the outside. Within these tapered slots 12 are loosely fitted a plurality of locking balls 13, 13 each having a diameter larger than the thickness of the extension 11.

A valve member, generally shown at 20, includes a cylindrical member 14 having a reduced diameter, which is closed at its one end with a blank flange 15 having a diameter slightly larger than the diameter of the central bore 5. The cylindrical member 14 is provided therethrough with a plurality of fluid passage means 16, and stepped at 17 outwardly to define a sliding portion 18 which abuts upon the inner surface of the housing 3 defining the main cavity 2. The cylindrical member 14 is also stepped at 19 to define a recess for receiving the male coupler.

A spring 21 is resiliently disposed between the step 9 and the blank flange 15 of the valve member 20 having its member 14 inserted into the central bore 5 so as to permit that flange 15 to be received in the central bore 5.

Figure 1:
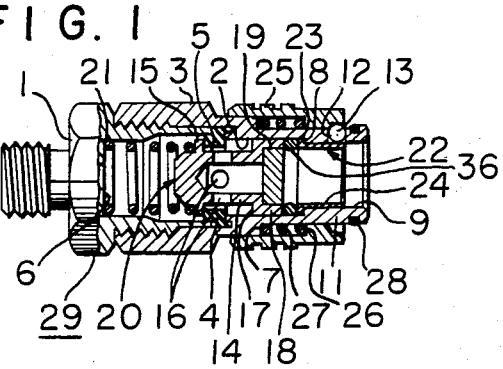
FIG. 1 is a sectional view of the socket used in the present invention.
Figure 3:
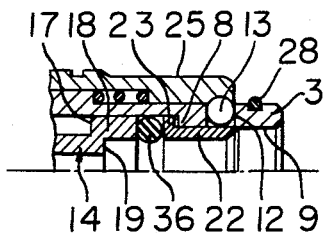
FIG. 3 is an enlarged sectional view of part of the arrangement according to the present invention, showing the relationship between the valve member and the locking ball-bearing annulus.
Figure 4:
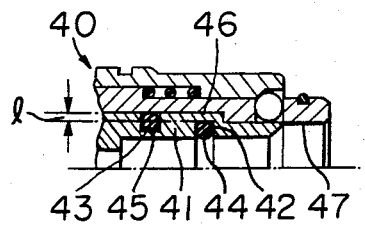
FIG. 4 is an enlarged sectional view of the prior art valve member.

It should be noted that a stop ring (not shown) may be fitted into a suitable portion of the inner surface of the socket assembly for engagement with, or disengagement from a step (not illustrated) provided on the outer surface of the end of the valve member 20. With this arrangement, it is possible to prevent the annular seal 4 from engaging with the flange 15 with a force larger than required under the action of the spring 21 in a state as illustrated in FIG. 1.

A locking ball-bearing annulus 22 is designed to be axially movable in the main cavity 2 in the housing 3, and includes a step 23 having a thickness substantially equal to that of the sliding portion 13 and engageable with the step 8. At its end opposite to the step 23, the annulus 22 prevents entrance of the balls 13 into the bore 5 from the slots 12.

A sleeve 25 for manipulation of the balls 13 is mounted on the outside of a part of the housing 3 for horizontal movement thereover. A spring 27 is resiliently disposed between the housing 3 and the sleeve 25 in the range of a step 7 of the housing 3 to a step 26 of the sleeve 25, thereby applying pressure on the balls 13.

Finally, a stop ring 28 is mounted around the outermost end of the housing 3 for the prevention of disengagement of the sleeve 25.

A male coupler or plug, generally shown at 31, will now be explained.

The plug 31 is slightly reduced in diameter at its one end 34. The slightly smaller end portion 34 of the plug 31 is engageable with recessed portion 19 through the annulus 22, causing backward movement or retraction of the valve member 20 and, thus, disengagement of the flange 15 out of the annular seal 4 to open the central bore 5. In addition, the plug 31 is provided on the outside of its intermediate portion with means 32 for causing retraction of the locking ball-bearing annulus 22. With this arrangement, the annulus 22 can be retracted at a given interval from the valve member 21 by engagement of its end with the means 32. Following the retraction means 32, a peripheral groove 33 is formed, within which the balls 13 are engageable.

The foregoing embodiment of the present invention operates as follows.

When the plug 31 is separated from the socket 29, the central bore 5 is closed as shown in FIG. 1, since the flange 15 of the valve member 20 of the socket 29 is received by the annular seal 4 under the action of the spring 21.

In the closed position, the valve member 20 advances within the main cavity 2 under the spring action of spring 21 together with an O-ring 36 in contact with the extension 11 of the valve member until the flange 15 abuts with the annular seal 4. As the step 23 of the locking ball-bearing annulus 22 includes a first surface and a second surface, the second surface is somewhat spaced away from the step 8 of the outer housing, no excessive external force is horizontally applied onto the O-ring 36. In this state, the locking balls 13 are forced up in the tapered slots 12 by the portion 24 of the annulus 22 with the end of the sleeve 25 advancing under the spring action of the spring 27 being engaged with the locking balls 13. Thus, no deformation or collapse of the O-ring 36 occurs in the state as illustrated in FIG. 1, since it is clamped between the valve member 20 and the locking ball-bearing annulus 22.

When the plug 31 is then inserted into the bore 9 in the socket 29, it is engaged at its smaller end portion 34 within the recess 19 of the valve member through the annulus 22. Thus, the space between the main bore 2 and the smaller end portion 24 of the plug 31 is already sealed. When the plug 31 is engaged at 32 with the end of the annulus 22, and forced further into the socket, the valve member 20 is moved back against the action of the spring 21 so that the blank flange 15 is spaced apart from the annular seal 4 to open the central bore 5, and the valve member 20 is engaged at 17 with the annular seal 4. The groove 33 of the plug is then located just below the tapered slots 12, into which the balls 13 are fitted. Thereafter, the sleeve 25 is moved under the action of the spring 27 into engagement with the stop ring 28, so that the balls 13 are tightly fitted into the groove 33 by the inner wall of the sleeve 25 for coupling of the plug 31 with the socket 29.

It is noted that the end of the sliding portion 18 of the valve member 20 is spaced away from the (left) end of the annulus 22 so as to apply no horizontally excessive force to the O-ring 36 which is now vertically compressed by the main bore 2 in the housing 3 and the smaller end portion 24 of the plug 31.

Thus, the socket and the plug are already sealed by the O-ring prior to coupling thereof.

To separate the plug from within the socket, the sleeve 25 is moved back against the action of the spring 27 to cause automatic back movement of the plug 31 under the action of the spring 21. The blank flange 15 of the valve member is then seated on the annular seal 4, so that the plug is forced out of the recess 19 in the valve member, resulting in removal of sealing.

According to the present invention, the removal of sealing is effected before and after coupling of the plug with the socket, so that no fluid leakage takes place during coupling of the plug with the socket.

The action and effect of the present invention will now be explained.

1. The arrangement, wherein the cylindrical valve member 20 is provided apart from the locking ball-bearing annulus 22, makes it possible to use, as the sealing planes, both the outer plane and the inner plane of the O-ring disposed therebetween, thus assuring complete sealing.

2. The plug and the socket is entirely sealed prior to complete coupling and decoupling thereof. Therefore, any fluid leakage is entirely avoided during coupling or decoupling.

3. In decoupling of the plug, the cylindrical valve member is sufficiently spaced away from the locking ball-bearing annulus. Consequently, no external force is axially applied to the O-ring, and any undesired stress is not applied to the O-ring during insertion of the plug. This assures that the O-ring suffers less change with time, retains its recovery of elasticity under compression, over extended periods and has improved durability.

4. It is unnecessary to provide any O-ring fitting groove in the valve member, which means that any cutting works are dispensed with, thus leading to a lowering of the cost. Omission of such a groove makes a great contribution to reducing the size of the socket, and makes it possible to manufacture easily a small-sized pipe coupler at a lower cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pipe coupler arrangement including a socket having therein a valve member provided with fluid passage means and a plug provided at one end face with means engageable with said valve member, and a locking ball being provided in the outer periphery of said socket and being engageable within, or disengaged from, a groove formed in the outer periphery of said plug, thereby coupling or decoupling said plug into or out of said socket comprising:

said valve member including a blank flange which is normally in abutting contact with an annular seal disposed in said socket while said plug is separated from said socket, thereby closing up said passage means;

said socket including a separate locking ball-bearing annulus which is not affixed to and is independently slidable toward said valve member by said plug in the course of coupling of said plug with said socket just before disengagement of said flange from said seal;

a single O-ring being disposed between said valve member and said locking ball-bearing annulus, said O-ring being axially compressed into engagement with both the inner surface of said socket and the outer surface of said plug when said locking ball-bearing annulus receives a force exerted by said plug, and said O-ring being not subjected to any axially excessive force to retain its original shape when said locking ball-bearing annulus receives no force from said plug due to the positioning of said O-ring between said valve member and said separate locking ball-bearing annulus.

2. A pipe coupler according to claim 1, and further including spring means operatively connected to said blank flange for normally biasing said blank flange into engagement with said annular seal when said plug is separated from said socket.

3. A pipe coupler according to claim 1, wherein said single O-ring includes an outer and an inner surface forming seals between an inner surface of said socket and an outer surface of said plug, respectively, when said plug is inserted into said socket.

4. A pipe coupler according to claim 1, wherein said single O-ring is axially displaced relative to said blank flange for engaging the outer surface of said plug to form a seal therebetween prior to engagement and disengagement of said blank flange from said annular seal.

5. A pipe coupler according to claim 1, and further including a sleeve means being spring biased to force said locking ball into engagement with said groove when said plug is inserted into said socket.

6. A pipe coupler according to claim 1, wherein said valve member includes a recess for engagement with said plug and a sliding portion being disposed adjacent thereto, said bearing annulus including a first surface being disposed adjacent to said sliding portion and including a second surface being axially displaced away from a housing portion of said socket, said single O-ring being positioned between said sliding portion and said first surface of said bearing annulus wherein said bearing annulus is permitted to move axially so that no excessive external force is applied to said single O-ring when said plug is separated from said socket.

7. A pipe coupler according to claim 6, wherein when said plug is inserted into said socket, an end portion of said plug engages said recess to axially displace said sliding portion away from said single O-ring so that no excessive horizontal force is applied to said single O-ring.

8. A pipe coupler according to claim 7, wherein said single O-ring is vertically compressed when said plug is inserted into said socket.

* * * * *